United States Patent Office 3,816,581
Patented June 11, 1974

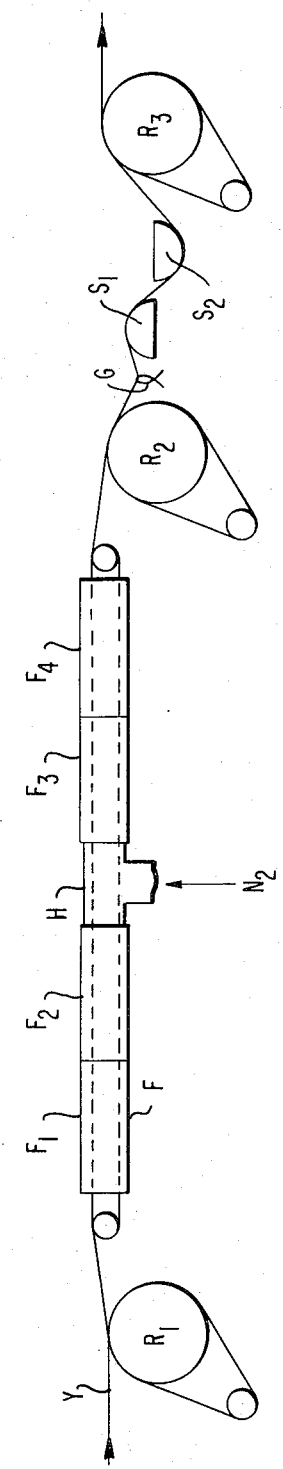

3,816,581
DRYING AND DRAWING PROCESS FOR POLY-
BENZIMIDAZOLE CONTINUOUS FILAMEN-
TARY MATERIALS
Arthur E. Prince, Jr., Basking Ridge, N.J., assignor to
Celanese Corporation, New York, N.Y.
Filed Mar. 31, 1972, Ser. No. 239,898
Int. Cl. B29b 11/22
U.S. Cl. 264—233                                              7 Claims

ABSTRACT OF THE DISCLOSURE

Polybenzimidazole continuous filamentary materials e.g., monofilament and multifilament strand, cable, yarn, tow, etc.) which contain any substantial quantities of residual moisture, such as solvent or wash water, may explode or burst during drawing. In the present process, the polybenzimidazole continuous filamentary material is dried by continuously passing the material in the direction of its length through an appropriate drying zone to reduce the moisture content to a level at which the material may be drawn without substantially adversely affecting the tensile properties or color of the material. The resulting dried material is continuously passed in the direction of its length from the drying zone into a drawing zone and there drawn on a continuous basis.

BACKGROUND OF THE INVENTION

The manufacture of polybenzimidazole continuous filamentary materials is well known in the art. A solution of polybenzimidazole in an appropriate solvent is formed into a continuous filamentary material, such as a yarn, and the material is washed. The washed material is dried and subsequently drawn.

The drawing of the polymeric continuous filamentary materials such as polybenzimidazole continuous filamentary materials is a well-known method for increasing the tensile properties, and particularly the tenacity, of the materials. It has been found, however, that polybenzimidazole continuous filamentary materials often explode during a drawing operation resulting in a porous product having relatively low tensile properties.

The explosion problem is believed due in large part to the presence of water or other moisture in the polybenzimidazole continuous filamentary materials, the water having been "picked up" primarily during the water washing step used to remove residual spinning solvent from the material. Much attention has therefore been directed to removal of the wash water prior to drawing.

It has been found that the explosion problem encountered during the drawing of polybenzimidazole continuous filamentary materials in batch processing is substantially lessened when the moisture content of the material is below about 2 percent by weight of the materials. Reduction, however, of the moisture content of polybenzimidazole material to such a low level by conventional techniques is not only difficult but expensive.

Polybenzimidazoles unlike most other synthetic and natural fibers have a relatively high natural moisture regain level, i.e., about 13 percent at ambient conditions (i.e., at a temperature of about 25° C. and a relatively humidity of about 65 percent). Most polymeric materials have a relatively low natural moisture regain level. Polyethylene terephthalate, for example, has a natural moisture regain level of about 0.5 percent. Cotton has a natural moisture regain level of about 10 percent. It is relatively easy to remove moisture down to about the natural moisture regain but removal of moisture below that level is difficult.

Polybenzimidazole continuous filamentary materials have heretofore been manufactured using batch processing techniques. That is, a particular quantity of the formed continuous filamentary material is gathered for subsequent processing. Usually a predetermined amount of as-spun polybenzimidazole continuous filamentary material is wound on a perforated bobbin and immersed in a liquid wash bath. The wound bobbin is pressure-washed for about 2 to 48 hours. The washed wound bobbins are then placed in an oven and heated to remove the wash liquid. Polybenzimidazole continuous filamentary materials oxidize easily with darkening and discoloration at elevated drying temperatures. The oxidized materials may also suffer a loss in physical properties. Removal of the contained moisture has generally been performed by drying with heat (e.g., electric ovens, muffle furnaces and the like). However, because of the oxidation problem, drying has to be performed at relatively low temperatures for relatively long times. For example, yarns are often wound on bobbins and placed in furnaces at temperatures of from about 100 to 250° C. for about 2 to about 9 days to dry the yarn sufficiently such that it may be drawn without a substantial explosion problem. This procedure is slow and adds considerable expense to the cost of the finished product. Also, the yarn on the bobbin may not be uniformly dried. That is, the yarn in the center of the winding on the bobbin often has a higher moisture content than yarn on the outside of the winding. In order to ensure complete drying within the winding, the wound bobbins must be heated for relatively long times. In addition, it has been found that the polybenzimidazole continuous filamentary material may pick up moisture from the atmosphere after drying and before drawing due to the high natural moisture regain level of polybenzimidazoles. It has therefore been found necessary to maintain a drying source, such as a light, on the dried, bobbin-wound material prior to drawing to minimize moisture pick-up.

Accordingly, it is an object of the present invention to provide an improved process for drying and drawing polybenzimidazole continuous filamentary material.

It is an object of this invention to provide a process for drying and drawing polybenzimidazole continuous filamentary material with a substantially lessened tendency towards oxidation of the material.

It is an object of this invention to provide a process for producing polybenzimidazole continuous filamentary materials having enhanced tensile properties.

It is an object of this invention to provide an improved process for drying and drawing polybenzimidazole continuous filamentary materials in which the materials are uniformly and rapidly dried.

It is an object of this invention to provide an improved process for drying and drawing polybenzimidazole continuous filamentary materials which minimizes possible moisture pick-up while the materials have a reduced moisture content.

It is an object of this invention to provide a drying and drawing process for polybenzimidazole continuous filamentary material which is suitable for use as a continuous process.

It is another object of the invention to provide an improved process for drawing polybenzimidazole continuous filamentary materials which can be performed in a relatively short time.

It is a further object of this invention to provide a process for increasing the tensile properties of polybenzimidazole continuous filamentary materials in a relatively short operating cycle and at a relatively low cost.

These and other objects, as well as the scope, nature and utilization of the invention will be apparent from the following detailed description and appended claims.

SUMMARY OF THE INVENTION

These and other objects of the invention are achieved by a continuous method for treating polybenzimidazole continuous filamentary materials which comprises continuously passing a polybenzimidazole continuous filamentary material containing in excess of about 15 percent moisture to a drying zone, continuously passing the said excess moisture-containing polybenzimidazole continuous filamentary material in the direction of its length through the said drying zone whereby the material is dried to a moisture content rendering it capable of being drawn without substantially adversely affecting the tensile properties or color of the material, continuously passing the dried material in the direction of its length from said drying zone to a drawing zone and drawing said dried material having a moisture content at the said reduced level while continuously passing the material through said drawing zone.

DESCRIPTION OF THE DRAWING

The Figure is a schematic view of an apparatus arrangement suitable for carrying out the process of the present invention.

DESCRIPTION OF THE PREFERRED EMBODIMENT

The starting polymer

Polybenzimidazoles are a known class of heterocyclic polymers which consist essentially of recurring units of the following Formulas I and II.

Formula I is:

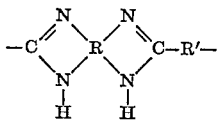

wherein R is a tetravalent aromatic nucleus, with the nitrogen atoms forming the benzimidazole rings being paired upon adjacent carbon atoms, i.e., ortho carbon atoms, of the aromatic nucleus, and R' is a member of the class consisting of an aliphatic (alkylene) group, a cycloaliphatic ring, an aromatic ring and a heterocyclic ring such as pyridine, pyrazine, furan, quinoline, thiophene, and pyran.

Formula II is:

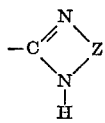

wherein Z is an aromatic nucleus having the nitrogen atoms forming the benzimidazole ring paired upon adjacent carbon atoms of the aromatic nucleus.

Preferably, the continuous filamentary materials are prepared from aromatic polybenzimidazoles, that is, from polymers consisting essentially of the recurring units of Formula II and of Formula I wherein R' is an aromatic ring or a heterocyclic ring.

As set forth in the U.S. Pat. 3,174,947 and Reissue Pat. 26,065, which are incorporated herein by reference, the aromatic polybenzimidazoles having the recurring units of Formula II may be prepared by self-condensing a trifunctional aromatic compound containing only a single set of ortho-disposed diamino substituents and an aromatic, preferably phenyl, carboxylate ester substituent. Exemplary of polymers of this type is poly-2,5(6)-benzimidazole prepared by the auto-condensation of phenyl-3,4-diaminobenzoate.

As also set forth in the above-mentioned patents, the aromatic polybenzimidazoles having the recurring units of Formula I may be prepared by condensing an aromatic tetraamine compound containing a pair of ortho-diamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

Examples of aromatic polybenzimidazoles which have the recurring structure of Formula I and which may be formed into fibers or yarns include:

poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4''')-5,5'-bibenzimidazole;
poly-2,2'-amylene-5,5'-bibenzimidazole;
poly-2,2'-octamethylene-5,5'-bibenzimidazole;
poly-2,6-(m-phenylene)-dimidazobenzene;
poly-2,2-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2''-(m-phenylene)-5,5'-di(benzimidazole)propane-2,2; and
poly-2,2''-(m-phenylene)-5,5'-di(benzimidazole)ethylene-1,2 where the double bonds of the ethylene groups are intact in the final polymer.

The preferred aromatic polybenzimidazole fiber or yarn is one prepared from poly-2,2'-(m-phenylene)-5,5'-bibenzimidazole, the recurring unit of which is:

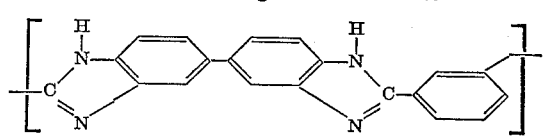

Any polymerization process known to those skilled in the art may be employed to prepare the polybenzimidazole which may then be formed into a continuous filamentary material. Preferred techniques used to prepare the polybenzimidazole are disclosed in U.S. Pats. 3,509,108 and 3,551,389, both assigned to the assignee of the present invention and both herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270 to 300° C. The reaction is conducted in a substantially oxygen-free atmosphere, i.e., below about 20 p.p.m. oxygen and preferably below about 8 p.p.m. oxygen, until a foamed prepolymer is formed having an inherent viscosity, expressed as deciliters per gram, of at least 0.1, and preferably from about 0.13 to 0.3, the inherent viscosity (I.V.) as used in the present specification and claims being determined from a solution of 0.4 grams of the polymer in 100 ml. of 97 percent $H_2SO_4$ at 25° C.

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g., 0.80 to 1.1 or more.

The temperature employed in the second stage is at least 250° C., preferably at least 325° C., and more preferably from about 350 to 425° C. The second stage reaction generally takes at least 0.5 hours, and preferably from about 1 to 4 hours or more.

A preferred method of preparing the polybenzimidazole is disclosed in the aforesaid U.S. Pat. 3,509,108. As disclosed therein, aromatic polybenzimidazoles may be prepared by initially reacting the monomer in a melt phase polymerization at a temperature above about 200° C. and a pressure above 50 p.s.i. (e.g., 300 to 600 p.s.i.) and then heating the resulting reaction product in a solid state polymerization at a temperature above about 300° C. (e.g., 350 to 500° C.) to yield the final product.

Preparation of the continuous filamentary material

The term "continuous filamentary material" as used herein is intended to include monofilaments and multifilaments such as strand, yarn, cable, tow, and the like.

As is well known, the polybenzimidazoles are generally formed into continuous filamentary materials by solution spinning, that is, by dry or wet spinning a solution of the polymer in an appropriate solvent such as dimethylacetamide, dimethylformamide, dimethylsulfoxide or sulfuric acid (used only in wet spinning) through an opening of predetermined shape into an evaporative atmosphere for the solvent in which most of the solvent is evaporated (dry) or into a coagulation bath (wet), resulting in the polymer having the desired shape.

The polymer solutions may be prepared in accordance with known procedures. For example, sufficient polybenzimidazole may be dissolved in the solvent to yield a final solution suitable for extrusion containing from about 10 to 45 percent by weight of the polymer, based on the total weight of the solution, preferably from about 20 to 30 percent by weight.

One suitable means for dissolving the polymer in the solvent is by mixing the materials at a temperature above the atmospheric boiling point of the solvent, for example 25 to 120° C. above such boiling point, and at a pressure of 2 to 15 atmospheres for a period of 1 to 5 hours.

Preferably, the polymer solutions, after suitable filtration to remove any undissolved portions, are dry spun. For example, the solutions may be extruded through a spinneret into a conventional type downdraft spinning column containing a circulating inert gas such as nitrogen, noble gases, combustion gases or superheated steam. Conveniently, the spinneret face is at a temperature of from about 100 to 170° C., the top of the column from about 120 to 220° C., the middle of the column from about 140 to 250° C., and the bottom of the column from about 160 to 320° C. After leaving the spinning column, the continuous filamentary materials are taken up, for example, at a speed in the range of from about 50 to 350 meters or more per minute. When the continuous filamentary materials are to be washed while wound on bobbins, the resulting "as-spun" materials may be subjected to a slight steam drawing treatment at a draw ratio of from about 1.05:1 to 1.5:1 in order to prevent the fibers from relaxing and falling off the bobbin during the subsequent washing step. Further details on a method of dry-spinning polybenzimidazole continuous filamentary materials are shown in U.S. Pat. 3,502,576 to Bohrer et al., assigned to the same assignee as the present application and herein incorporated by reference.

Desirably, the continuous filamentary materials are next washed so as to remove at least the major portion of residual spinning solvent, e.g., so that the washed materials contain less than about 1% by weight solvent based on the weight of the continuous filamentary material, and preferably so as to obtain an essentially spinning solvent-free continuous filamentary material (that is, below about 0.1 percent by weight). Typically, a simple water wash is employed; however, if desired, other wash materials such as acetone, methanol, methyl ethyl ketone and similar solvent-miscible and volatile organic solvents may be used in place of or in combination with the water. The washing operation may be conducted by collecting the polybenzimidazole continuous filamentary material on perforated rolls or bobbins, immersing the rolls in the liquid wash bath and pressure washing the continuous filamentary material, for example, for about 2 to 48 hours or more. The materials may also be washed in the continuous manner disclosed in my copending application Ser. No. 239,973, entitled "Process and Apparatus for Washing Residual Solvent From As-Spun Polybenzimidazole Continuous Filamentary Materials," filed of even date herewith, which is herein incorporated by reference. In the aforesaid application, polybenzimidazole continuous filamentary materials are washed by passing the materials through the washing liquid in a particular manner as described therein for a time sufficient to reduce the residual solvent content below 1 percent by weight of the materials and preferably so as to obtain a solvent-free (i.e., less than about 0.1 percent by weight) material.

The washed continuous filamentary materials often contain substantial amounts of water in excess of the natural moisture regain level. For example, the continuous filamentary materials can contain up to about 200 percent, often from about 15 to about 100 percent, by weight of water which represents from up to about 187 percent, often from about 2 to about 87 percent, by weight of water in excess of the natural moisture level. Substantially all of this water should be removed in order to avoid substantial weakening of the tensile properties of the continuous filamentary material by explosion during drawing.

While, as noted before, the polybenzimidazole continuous filamentary materials may be washed while either wound up on perforated bobbins or unwound, the drying step of the process of the present invention should be performed upon unwound materials. That is, the polybenzimidazole continuous filamentary material is removed from the washing zone and continuously passed in the direction of its length to the drying zone.

The polybenzimidazole continuous filamentary materials may be heated in the drying zone to a temperature and for a time sufficient to remove at least the major portion of moisture contained therein and to reduce the moisture content to a level rendering the material capable of being drawn without substantially adversely affecting the tensile properties or color of the material. These materials may, for example, be heated to a temperature of from about 150 to about 500, preferably from about 250 to about 460° C. for a time of from about ½ to about 10, preferably from about 1 to about 3, minutes to reduce the moisture content of the material to below about 2.0 percent by weight, preferably below about 0.5 percent by weight. As known in the art, polybenzimidazoles oxidize easily and turn dark. A loss in physical properties may also result from oxidation. It is therefore preferable that the polybenzimidazole continuous filamentary materials not be heated above the point of oxidation of the fibers.

The polybenzimidazole continuous filamentary materials may be heated in the drying zone by any suitable heating apparatus. For example, the material may be advanced in the direction of its length and continuously passed to and through a muffle or radiant heat furnace of appropriate length. Hot gas zones known to the skilled artisan may also be employed. Also, the continuous filamentary material may be advanced in the direction of its length and continuously passed into contact with a heated contact surface such as a hot roll, shoe, pin or plate. Combinations of heating devices may also be employed in the heating zone. That is, the continuous filamentary material may be continuously advanced in the direction of its length and continuously passed through a muffle furnace into continuous contact with a hot shoe or vice versa. It is preferable that the continuous filamentary material be heated in a furnace or hot gas zone or the like to minimize possible abrasion of the materials during drying.

Drying is conducted under an air atmosphere or preferably under an inert gas such as argon, nitrogen, carbon dioxide, steam or the like. The atmosphere may also have a moisture content less than that of the material and preferably will be an essentially dry gas.

Removal of residual moisture may also be performed in accordance with the techniques disclosed in U.S. patent application Ser. No. 239,971, entitled "Process for Forming Polybenzimidazole Continuous Filamentary Materials of Enhanced Tensile Properties Employing Microwave Drying," filed of even date herewith by Arthur E. Prince, Jr., and Kenneth S. Burns, and U.S. patent application Ser. No. 240,229, entitled "Process for Forming Polybenzimidazole Continuous Filamentary Materials of Enhanced Tensile Properties Employing Dielectric Drying," filed of even date herewith by Arthur E. Prince, Jr. and Kenneth S. Burns, both assigned to the assignee of the present invention and both herein incorporated by reference.

The former application discloses a process for removing substantial amounts of moisture from polybenzimidazole continuous filamentary materials by subjecting the material to an electric field having a frequency in the microwave range (such as, for example, from about 900 to 930 or from about 2425 to 2475 megahertz) to remove at least the water in excess of the natural moisture regain level, drying the material to remove at least the major portion of remaining moisture (such as to below about 2.0 percent by weight) and drawing the dried material.

The latter application also discloses a process for removing large amounts of moisture from excess moisture-containing polybenzimidazole continuous filamentary materials prior to drawing. As set forth therein, the excess moisture-containing polybenzimidazole continuous filamentary material is subjected to an electric field having a frequency in the range of from about 2 to 100 megahertz to remove at least the moisture in excess of the natural moisture regain level, dried and drawn.

The temperature of drying utilizing either of these techniques is generally below about 150° C. These forms of drying are particularly advantageous when it is desired to maintain yarn temperatures as low as possible.

The dried polybenzimidazole continuous filamentary material of reduced moisture content may then be continuously advanced in the direction of its length and continuously passed from the drying zone into a drawing zone and drawn while having a moisture content at the reduced level and while being continuously passed through the drawing zone. Since polybenzimidazole materials have a high natural moisture regain level, the drawing zone should be located adjacent the drying zone to minimize exposure of the dried material to the atmosphere. A shroud or hood can be used to maintain the dried material in an essentially inert atmosphere between the drying zone and the drawing zone. Residence time of the dried material in air before drawing should be less than about 5, preferably less than about 2, seconds.

Drawing of the polybenzimidazole continuous filamentary material may be performed in any suitable manner according to drawing procedures known to those skilled in the art. Particularly preferred drawing techniques are disclosed in U.S. Pat. 3,622,660 of George F. Ecker and Thomas C. Bohrer and U.S. Pat. 3,541,199 of Thomas C. Bohrer and Arnold J. Rosenthal. Both the patents are assigned to the same assignee as the present invention and are herein incorporated by reference. For example, the polybenzimidazole continuous filamentary material may be drawn at high drawing speeds, that is, the speed of the supply roll may be on the order of 15 to 50 meters per minute or higher. The limiting factor of the drawing speed is the particular design of the drawing apparatus and the elastic properties of the fiber.

The polybenzimidazole continuous filamentary material may be subjected to a hot drawing treatment in any convenient hot drawing apparatus or zone, for example, by passing the material over a heated surface such as a hot roll, shoe, pin or plate or by passing the material through a radiantly heated zone, such as a muffle furnace.

Hot drawing is suitably conducted at a temperature of above about 350° C. up to about the degradation temperature of the polybenzimidazole continuous filamentary material, preferably from about 375° to 650° C., and more preferably from about 390° to 480° C., depending upon the size of the yarn bundle and residence time.

The polybenzimidazole continuous filamentary material may be drawn at any desired draw ratio below that at which it breaks, typically from above about 1.5:1 to 4.5:1, and preferably from about 2.5:1 to 3.5:1. The hot drawing residence time, i.e., the time during which the material is being heated, is usually from about 0.2 to 50 seconds, preferably 0.5 to 10 seconds, and more preferably 0.5 to 5 seconds. Substantially longer residence times at the elevated drawing temperatures may cause degradation. Other suitable polybenzimidazole drawing techniques will be apparent to those skilled in the art. Since polybenzimidazole materials have a high natural moisture regain level, the dried continuous filamentary materials should be maintained in a dry, preferably inert, atmosphere until drawing is completed. The materials can be maintained, for example, in an atmosphere such as air, argon, nitrogen, carbon dioxide, steam or the like.

The resulting drawn polybenzimidazole continuous filamentary materials of the present invention are characterized by a high degree of thermal stability and show great resistance to degradation by heat, hydrolytic media and oxidizing media. They may be used, for example, in deceleration chutes for aircraft, chutes for re-entry capsules, high temperature dust collector bags, non-flammable clothing and fabrics and in spacesuits and flight clothing.

The invention is additionally illustrated in connection with the following examples which are to be considered as illustrative of the present invention. It should be understood, however, that the invention is not limited to the specific details of the examples.

EXAMPLE I

A polybenzimidazole yarn, namely, poly-2,2'-(m-phenylene)-5,5'-bibenzimidazole, is selected as the exemplary polybenzimidazole for use in carrying out the process of this invention.

The polymer is formed into an as-spun yarn in the manner described in the Example I of U.S. Pat. 3,502,756 to Bohrer et al. More particularly, a dope of dimethylacetamide containing 23 percent by weight of the polymer is extruded through a 110-hole jet into a dry spinning chamber containing superheated steam as the drying atmosphere. A 300/110 yarn (110 filaments making up a yarn having an overall denier of 300) is formed from the as-spun yarn.

The 300/110 yarn is washed for 48 hours by batch pressure washing on a bobbin until the residual spinning solvent content is essentially zero. The yarn is removed and strung up to continuously pass through a drying zone composed of four muffle furnaces (total zone length of about 20 feet) at varying speeds and temperatures. The heating zones have a nitrogen atmosphere.

As shown in the Figure, the yarn Y is passed over a feed roll $R_1$ and into the furnace zone F (which in this Example is composed of four furnaces, $F_1$, $F_2$ $F_3$ and $F_4$, each at the same temperature). Furnaces $F_2$ and $F_3$ are separated by hood portion H which also contains the inlet for the nitrogen atmosphere. The yarn is continuously advanced through the furnace zone F by using multiple passes to achieve a residence time of about 2 minutes. The dried yarn then continuously passes over furnace take-up roll $R_2$ (same speed) which in turn feeds the dried material into a drawing zone containing two hot shoes, $S_1$ and $S_2$ (20 inch contact zone) heated to varying temperatures. A suitable yarn guide G may be employed to guide the yarn. The drawn yarn passes over drawing take-up roll $R_3$ which is operating at twice the speed of $R_1$ and $R_2$, and may be taken off for further processing.

Each run is performed at a 2:1 draw ratio yielding a yarn product having a d.p.f. (denier per filament) of 1.5. Tensile strength and percent elongation of the drawn samples are measured.

The operating conditions and test results are set forth in Table I below.

TABLE I

| Run | Drying furnace temperature, °C. | Roll speed, meters/minute | | Drawing shoe temperature, °C. | | Tensile strength, grams/denier | Elongation, percent |
|---|---|---|---|---|---|---|---|
| | | $R_1 R_2$ | $R_3$ | Shoe 1 | Shoe 2 | | |
| A | 275 | 20 | 40 | 340 | 430 | 4.03 | 25.1 |
| B | 275 | 30 | 60 | 340 | 430 | 4.22 | 29.3 |
| C | 275 | 30 | 60 | 360 | 440 | 3.78 | 25.3 |
| D | 275 | 40 | 80 | 360 | 440 | 3.63 | 26.3 |
| E | 325 | 40 | 80 | 360 | 440 | 4.45 | 26.9 |
| F | 350 | 50 | 100 | 380 | 450 | 3.73 | 28.4 |
| G | 400 | 40 | 80 | 360 | 440 | 3.97 | 29.7 |
| H | 400 | 50 | 100 | 360 | 440 | 4.54 | 28.3 |
| I | 400 | 50 | 100 | 380 | 450 | 3.76 | 28.7 |

As may be seen from the Table, the drawn samples each show excellent physical properties. In addition, all of the samples exhibited a reduced color change by oxidation as compared with polybenzimidazole yarn dried and drawn in accordance with known procedures. The yarn before drying had a water content of about 100 percent by weight of the fiber while the yarn at the end of the drying operation contained a minimal amount of residual water, i.e., about 0.5 percent by weight of the yarn.

EXAMPLE II

Samples of a 990 filament tow (2700 overall denier) of the polybenzimidazole of Example I are pressure-washed on a bobbin for 48 hours. The samples are dried and drawn with the apparatus and procedure of Example I. Another sample is processed soaking wet, e.g. with excess visible water contained thereon, while still another sample is first dried at a temperature of about 150° C. for 9 days.

Test conditions and results are shown in Table II.

TABLE II

| | Roll speed, meters/minute | | Shoe temperature, °C. | | Tensile strength/tenacity, grams/denier | Elongation, percent |
|---|---|---|---|---|---|---|
| | $R_1 R_2$ | $R_3$ | $S_1$ | $S_2$ | | |
| Furnace zone temperature, °C.: | | | | | | |
| 400* | 20 | *40 | 385 | 440 | 3.78 | 13.2 |
| 275** | 30 | **60 | 340 | 430 | 4.75 | 22.9 |
| 275 | 30 | 60 | 360 | 440 | 4.80 | 21.5 |
| 275 | 30 | 60 | 375 | 445 | 4.74 | 28.8 |
| 275 | 30 | 60 | 320 | 456 | 3.74 | 28.0 |

*Yarn was soaking wet.
**Yarn was previously batch dried.

Example III

A continuous length of 2700/990 yarn is continuously washed in accordance with Example III of my copending application er. No. S239,973, entitled "Process and Apparatus for Washing Residual Solvent From As-Spun Polybenzimidazole Continuous Filamentary Materials," filed of even date herewith.

The continuous length of continuously washed yarn is continuously advanced in the direction of its length from the washing zone to the drying-drawing apparatus of Example I herein. Residence time in the drying zone was about 2 minutes. The operating conditions and results obtained are shown below in Table III.

TABLE III

| | Roll speed, meters/minute | | Shoe temperature, °C. | | Tensile strength/tenacity, grams/denier | Elongation, percent |
|---|---|---|---|---|---|---|
| | $R_1 R_2$ | $R_3$ | $S_1$ | $S_2$ | | |
| Furnace temperature, °C.: | | | | | | |
| 350 | 20 | 40 | 375 | 440 | 4.16 | 22.4 |
| 350 | 30 | 60 | 375 | 440 | 4.31 | 21.6 |

Example IV

Five bobbins of 200 fil yarn of the polybenzimidazole are plied to form a 1000 fil yarn which is continuously washed to give a residual solvent level of 0.25 percent, dried and drawn in the manner of Example III. The operating conditions are shown in Table IV below.

TABLE IV

| | Roll speed, meters/minute | | Shoe temperature, °C. | | Tensile strength/tenacity, grams/denier | Elongation, percent |
|---|---|---|---|---|---|---|
| | $R_1 R_2$ | $R_3$ | $S_1$ | $S_2$ | | |
| Furnace temperature, °C.: | | | | | | |
| 350 | 40 | 80 | 375 | 440 | 3.72 | 29.8 |
| 350 | 40 | 80 | 400 | 400 | 3.60 | 26.4 |
| 350 | 40 | 80 | 415 | 440 | 4.18 | 19.5 |
| 350 | 50 | 100 | 375 | 440 | 3.99 | 21.2 |
| 350 | 50 | 100 | 400 | 440 | 4.20 | 23.7 |
| 350 | 50 | 100 | 415 | 440 | 4.61 | 20.0 |
| 350 | 50 | 100 | 375 | 440 | 4.15 | 19.2 |

Example V

A third drawing shoe ($S_3$) is added to the drying-drawing apparatus of Example I and a sample of batch-washed 2700/990 yarn is continuously processed therethrough. Residence time in the drying zone is two minutes. Operating conditions and results obtained are shown below in Table V.

TABLE V

| Furnace temperature, °C. | Roll speed, meters/minute | | Shoe temperature, °C. | | | Tensile strength/ tenacity, grams/ denier | Elongation, percent |
|---|---|---|---|---|---|---|---|
| | $R_1R_2$ | $R_3$ | $S_1$ | $S_2$ | $S_3$ | | |
| 400 | 20 | 40 | 300 | 400 | 450 | 4.87 | 17.2 |

Example VI

The as-spun yarn of Example I is formed into tows containing from 1,000 to 5,000 filaments. The tows are washed in water at 90° C. and dried and drawn in the apparatus of Example V with a drying zone residence time of two minutes. Operating conditions and results are shown below in Table VI.

TABLE VI

| Furnace temperature, °C. | Roll speed, meters/minute | | Shoe temperature, °C. | | | Tensile strength/ tenacity, grams/ denier | Elongation, percent |
|---|---|---|---|---|---|---|---|
| | $R_1R_2$ | $R_3$ | $S_1$ | $S_2$ | $S_3$ | | |
| 2,000 filaments | | | | | | | |
| 500 | 30 | 60 | 325 | 428 | 465 | 22.0 | 4.53 |
| 500 | 30 | 60 | 325 | 400 | 430 | 10.7 | 4.93 |
| 3,000 filaments | | | | | | | |
| 510 | 30 | 60 | 365 | 472 | 482 | 26.4 | 3.95 |
| 510 | 30 | 60 | 355 | 455 | 465 | 23.5 | 4.10 |
| 510 | 30 | 60 | 355 | 428 | 445 | 12.3 | 4.32 |
| 4,000 filaments | | | | | | | |
| 470 | 22.5 | 45 | 455 | 460 | 470 | 25.0 | 4.58 |
| 470 | 22.5 | 45 | 335 | 438 | 472 | 19.6 | 4.00 |
| 430 | 26.2 | 50 | 460 | 470 | 470 | 22.2 | 4.45 |
| 5,000 filaments | | | | | | | |
| 430 | 23.5 | 45 | 430 | 482 | 482 | 24.6 | 4.37 |
| 430 | 23.5 | 45 | 365 | 477 | 477 | 26.1 | 4.45 |

Example VII

The 300/110 yarn of Example I is continuously passed from the washing zone to an electric field generator as described in Example I of the aforesaid U.S. patent application Ser. No. 239,971 having a frequency of 2450 megahertz. The yarn is contacted with the field for about 6 minutes and is continuously drawn over two hot shoes (20 inch contact zone) at a 2:1 draw ratio. The first shoe has a temperature of 375° C. and the second shoe has a temperature of 440° C. The resulting product is substantially non-porous and has good physical properties.

Use of an electric field generator having a frequency of about 20 megahertz such as described in Example I of the aforesaid U.S. patent application Ser. No. 240,229 for about the same time, results in a drawn product with similar properties.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. In the process for producing drawn polybenzimidazole continuous filamentary materials wherein polybenzimidazole is wet or dry solution spun into a continuous filamentary material, the resulting as spun-filamentary material is washed to remove at least the major portion of residual spinning solvent, the washed filamentary material is dried in order to remove moisture that adversely affects the propeties of the filamentary material during drawing, and the dried polybenzimidazole continuous filamentary material is thereafter drawn, the improvement which comprises:

(a) continuously passing said as-spun, washed polybenzimidazole continuous filamentary material, containing moisture in excess of the natural moisture regain level, to and through a drying zone maintained at a temperature of from about 150 to about 500° C., said material being passed in the direction of its length through the said drying zone for a time of from about ½ to about 10 minutes whereby the material is dried to a moisture content rendering it capable of being drawn without substantially adversely affecting the tensile properties or color of the material; and (b) continuously passing the resulting dried material in the direction of its length from said drying zone to a drawing zone wheren said dried material is drawn at a temperature above about 350° C. up to about the degradation temperature of the polybenzimidazole continuous filamentary material and at a draw ratio of from about 1.5:1 to 4.5:1 for about 2 to 50 seconds to yield a drawn polybenzimidazole continuous filamentary material.

2. The continuous method of claim 1 wherein the drying is conducted at a temperature of from about 250 to about 460° C.

3. The continuous method of claim 2 wherein the polybenzimidazole continuous filamentary material is continuously passed through the said drying zone for a time of from about 1 to 3 minutes.

4. The continuous method of claim 1 wherein said excess moisture-containing polybenzimidazole is dried to a moisture content of less than about 2.0 percent by weight.

5. The continuous method of claim 4 wherein said excess moisture-containing polybenzimidazole contains from about 15 to about 100 percent by weight of moisture.

6. The continuous method of claim 5 wherein said excess moisture-containing polybenzimidazole is dried to a moisture content of less than about 0.5 percent by weight.

7. The continuous method of claim 6 wherein said drying zone has an inert atmosphere.

References Cited

UNITED STATES PATENTS

| | | | |
|---|---|---|---|
| 2,433,842 | 1/1948 | Griffin | 28—62 |
| 2,692,875 | 11/1954 | Weinstock et al. | 28—62 |
| 3,523,151 | 8/1970 | Steinberg | 264—210 F |
| 3,526,693 | 9/1970 | Rulison et al. | 264—210 F |
| 3,584,104 | 6/1971 | Bohrer et al. | 264—210 F |
| 3,622,660 | 11/1971 | Ecker | 264—290 R |
| 3,619,453 | 11/1971 | Riggs | 264—210 F |
| 3,657,411 | 4/1972 | Bohrer et al. | 264—204 |

JAY H. WOO, Primary Examiner

U.S. Cl. X.R.

34—1, 23; 264—184, 203, 210 F, 290